US009335776B2

(12) United States Patent
Follic et al.

(10) Patent No.: US 9,335,776 B2
(45) Date of Patent: May 10, 2016

(54) REACTIVE POWER COMPENSATOR

(71) Applicant: Schneider Electric Industries SAS, Rueil-Malmaison (FR)

(72) Inventors: Stephane Follic, Lumbin (FR); Remy Orban, Saint Martin d'Uriage (FR); Lionel Urankar, Grenoble (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 238 days.

(21) Appl. No.: 14/036,391

(22) Filed: Sep. 25, 2013

(65) Prior Publication Data

US 2014/0097809 A1    Apr. 10, 2014

(30) Foreign Application Priority Data

Oct. 5, 2012  (FR) ..................... 12 59477

(51) Int. Cl.
*G05F 1/70*  (2006.01)
*H02J 3/18*  (2006.01)

(52) U.S. Cl.
CPC .................. *G05F 1/70* (2013.01); *H02J 3/1821* (2013.01); *Y02E 40/30* (2013.01)

(58) Field of Classification Search
CPC ............. G05F 1/70; H02J 3/16; H02J 3/1878; H03H 7/20; H03H 7/18; H02M 1/042; Y02B 70/126; Y02B 40/30; Y02B 40/12
USPC .................................................. 323/205–219
See application file for complete search history.

(56) References Cited

U.S. PATENT DOCUMENTS

| 4,348,631 | A | * | 9/1982 | Gyugyi et al. | ................. 323/211 |
| 4,571,535 | A | | 2/1986 | Gyugyi | |
| 5,684,389 | A | * | 11/1997 | Tyll et al. | ....................... 323/209 |

(Continued)

FOREIGN PATENT DOCUMENTS

GB    2 304 240    3/1997

OTHER PUBLICATIONS

French Preliminary Search Report issued Jun. 14, 2013, in French 1259477, filed Oct. 5, 2012 (with English Translation of Categories of Cited Documents).

(Continued)

*Primary Examiner* — Nguyen Tran
(74) *Attorney, Agent, or Firm* — Oblon, McClelland, Maier & Neustadt, L.L.P.

(57) ABSTRACT

A reactive power compensator for a three-phase network having first, second and third phases includes an assembly of capacitors and electromechanical contactors electrically connected to the capacitors. Each contactor includes at least one upstream and one downstream power terminal. An electric current circulates between the upstream and downstream power terminals when the contactors are closed. A first contactor is connected to the first phase and a second contactor is connected to the third phase. The voltage between the upstream and downstream power terminals of at least one electromechanical contactor is measured so that the electromechanical contactors can be controlled according to a control algorithm. The control algorithm includes the closure of a contactor for a substantially zero voltage between the upstream and downstream power terminals thereof, and the opening a contactor for a substantially minimum power value of the capacitors to which the contactor is connected.

18 Claims, 2 Drawing Sheets

(56) References Cited

U.S. PATENT DOCUMENTS

Figure 1:
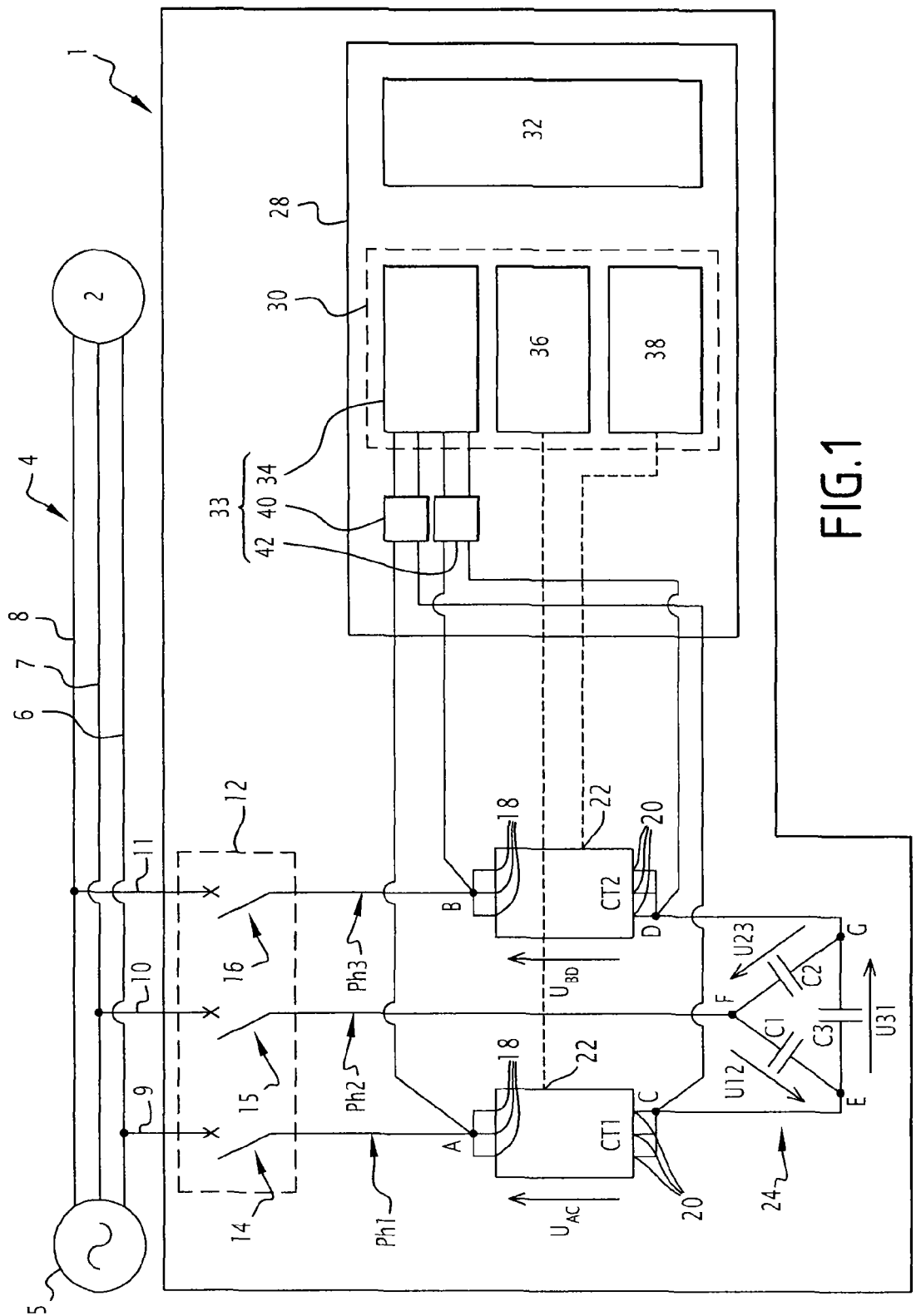

| | | |
|---|---|---|
| 5,963,021 A | 10/1999 | Rostron et al. |
| 6,107,785 A | 8/2000 | Griffiths |
| 6,121,758 A | 9/2000 | Bellina et al. |
| 2008/0203979 A1* | 8/2008 | Su .................................. 323/209 |

OTHER PUBLICATIONS

Guy Olivier, et al., "Minimal Transient Switching of Capacitors", IEEE Transactions on Power Delivery, vol. 8, No. 4, Oct. 1993, pp. 1988-1994.

* cited by examiner

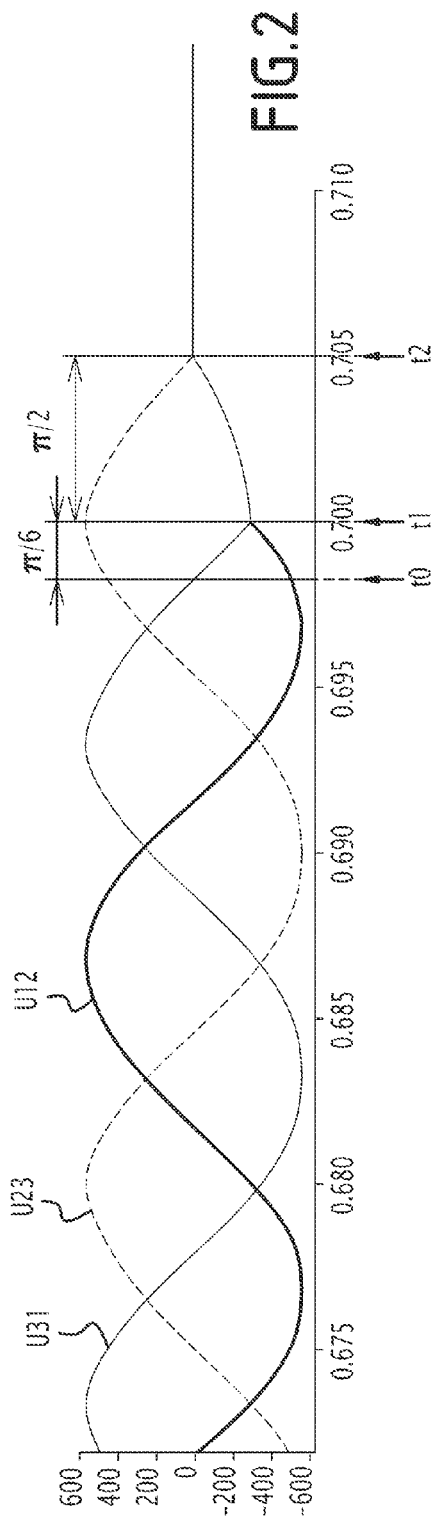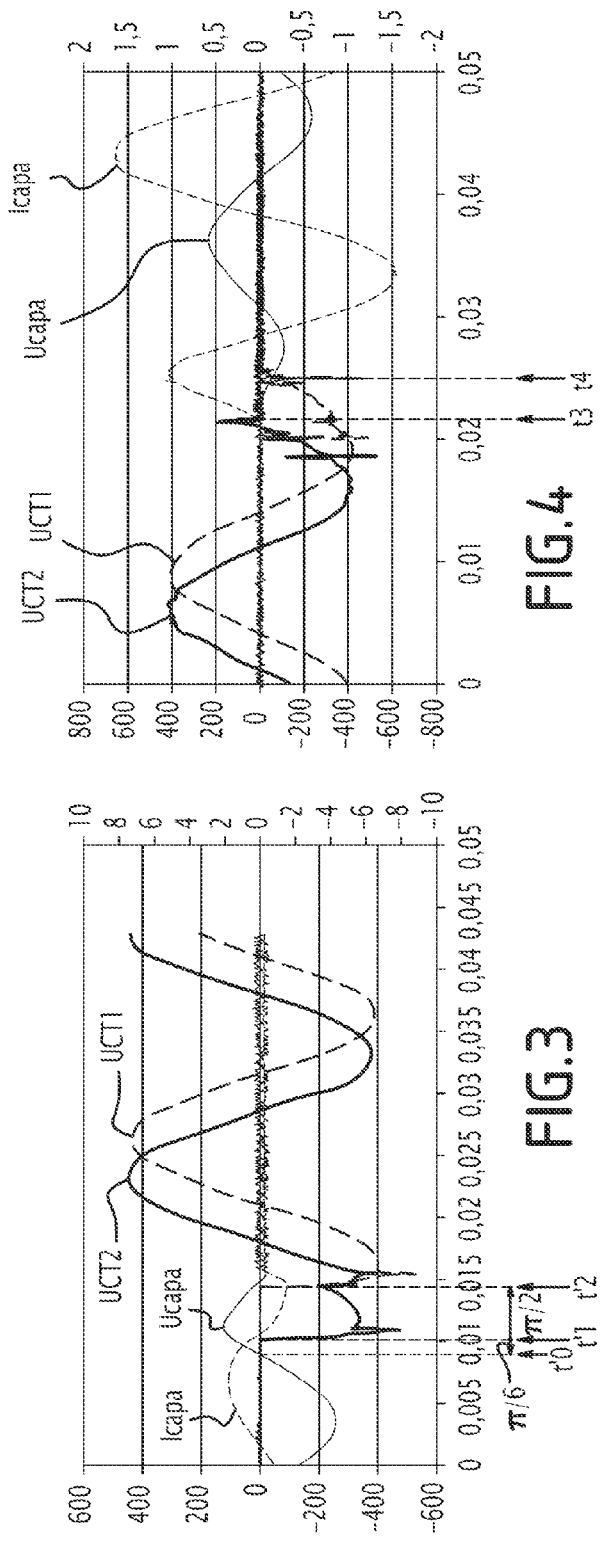

REACTIVE POWER COMPENSATOR

The present invention relates to a reactive power compensator for a three-phase network having a first phase, a second phase and a third phase. The compensator according to the invention comprises a capacitor assembly, at least two electromechanical contactors electrically connected to the capacitor assembly, each contactor comprising at least one upstream power terminal and at least one downstream power terminal, an electric current being suitable for circulating between the upstream and downstream power terminals in the closed position of the contactor, a first contactor being suitable for being connected to the first phase and a second contactor being suitable for being connected to the third phase, means for measuring the voltage between the upstream and downstream power terminals of at least one electromechanical contactor, and means for controlling the electromechanical contactors according to a predetermined control algorithm.

Reactive power compensators comprising electromechanical contactors with a pre-insertion resistor device for limiting the peak current at the time of contactor engagement, i.e. when the contactor allows the current to flow, are known.

However, the control algorithm for the electromechanical contactors is asynchronous and engagement of the contactors is liable to occur at maximum voltage of the terminals of a contactor. In this case, the compensator should withstand very high peak currents, giving rise to high levels of stress and this solution, although relatively inexpensive, may exhibit weaknesses over time adversely affecting the reliability thereof. Moreover, the capacitor discharge time via discharge resistors is significant while being conventionally less than one minute, and this solution is not suitable for active reactive power compensation, such as compensation with a discharge of the capacitor assembly in some tens of ms.

The aim of the invention is thus that of providing a reactive power compensator for reducing the risks of damage to electromechanical contactors, while carrying out much more rapid reactive power compensation, i.e. compensation with a discharge of the capacitor assembly in some tens of ms.

For this purpose, the invention relates to a reactive power compensator of the type mentioned above, characterised in that the control algorithm comprises the closure of a respective electromechanical contactor for a substantially zero voltage between the upstream and downstream power terminals thereof, and the opening of a respective electromechanical contactor for a substantially minimum power value of the capacitor or the capacitors to which said contactor is connected.

According to further advantageous aspects of the invention, the reactive power compensator comprises one or a plurality of the following features, taken alone or according to any technically feasible combinations:

- the measuring means are suitable for measuring the voltage between the upstream and downstream power terminals of the first contactor, on the one hand, and of the second contactor, on the other hand, and the closure of the respective contactor is determined on the basis of the voltage measured between the upstream and downstream power terminals of the contactor;
- the measuring means are suitable for measuring only the voltage between the upstream and downstream power terminals of the first contactor, and the closure of the respective contactor is determined on the basis of the voltage measured by the measuring means, the closure of the second contactor being determined as a function of that of the first contactor with a predetermined time delay between the closure of the first contactor and the closure of the first contactor and the closure of the second contactor;
- the three-phase voltage of the network is periodic, and the predetermined time delay is substantially equal to one quarter of the three-phase voltage period;
- the reactive power compensator comprises exactly two electromechanical contactors;
- the capacitor assembly comprises three capacitors arranged according to a triangular configuration, a first capacitor being connected between the first and second phases, a second capacitor being connected between the second and third phases, and a third capacitor being connected between the first and third phases;
- the conditions for opening the first contactor to obtain the minimum power value stored in the capacitors verify the following equation:

$$U31 - U12 = 0$$

where $U31$ represents the voltage at the terminals of the third capacitor and $U12$ represents the voltage at the terminals of the first capacitor;
- the conditions for opening the second contactor to obtain the minimum power value stored in the capacitors verify the following equation:

$$U31 - U23 = 0$$

where $U31$ represents the voltage at the terminals of the third capacitor and $U23$ represents the voltage at the terminals of the second capacitor;
- the power compensator comprises three contactors, each being suitable for being electrically connected to a respective phase of the network;
- the closure of each contactor corresponds to a zero voltage between the upstream and downstream power terminals thereof within a first tolerance, the first tolerance being preferably equal to plus or minus 800 µs;
- the opening of each contactor corresponds, within a second tolerance, to the minimum value of the power of the capacitor or the capacitors to which said contactor is connected, the second tolerance being preferably equal to plus or minus 500 µs; and
- the means for controlling the contactors are suitable for sending control signals to the contactors, and the control means further comprise means for time shifting the transmission of the control signal according to a switching time measurement of each of the contactors.

These features and advantages of the invention will emerge on reading the description hereinafter, given merely as a non-limiting example, with reference to the appended figures, wherein:

FIG. 1 is an electrical diagram of a reactive power compensator according to the invention, the reactive power compensator comprising a capacitor assembly and two electromechanical contactors electrically connected to the capacitor assembly, FIG. 2 is a set of curves representing the progression over time of the voltages at the capacitor terminals of the compensator in FIG. 1, for the successive opening of the two contactors, FIG. 3 is a set of curves representing the progression over time of a voltage and a current at the terminals of a capacitor and voltages between the upstream and downstream power terminals of two contactors, for the successive opening of the two contactors, and FIG. 4 is a set of curves representing the progression over time of a voltage and a current at the terminals of a capacitor and voltages between the upstream and downstream power terminals of two contactors, for the successive closure of the two contactors.

In FIG. 1, a reactive power compensator 1 and an electrical load 2 are electrically connected to an A.C. network 4, the A.C. network 4 being powered by an A.C. voltage generator 5 and comprising a plurality of phase conductors 6, 7, 8. In the example of an embodiment in FIG. 1, the A.C. network 4 is a three-phase network and comprises a first phase conductor 6, a second phase conductor 7, and a third phase conductor 8. The three-phase voltage of the A.C. network 4 is periodic. The network frequency is, for example, equal to 50 Hz or 60 Hz, and the three-phase voltage period is equal to 20 ms or 16.67 ms.

The reactive power compensator 1 is connected to the first 6, second 7 and third 8 phase conductors, respectively, by a first electrical connection 9, a second electrical connection 10, and a third electrical connection 11, respectively. Hereinafter in the description, the first electrical connection 9 connected to the first phase conductor 6 corresponds to the first phase, referenced Ph1, the second electrical connection 10 connected to the second phase conductor 7 corresponds to the second phase, referenced Ph2, and the third electrical connection 11 connected to the third phase conductor 8 corresponds to the third phase, referenced Ph3.

The reactive power compensator 1 comprises a three-phase circuit breaker 12 comprising first 14, second 15 and third 16 circuit-breaking modules connected to the first, second and third phases, respectively. Alternatively, the reactive power compensator comprises three separate circuit breakers, each being connected to a respective phase of the first, second and third phases.

Additionally and optionally, the reactive power compensator 1 also comprises a first inductive resistor, a second inductive resistor, and a third inductive resistor, not shown, associated with the first, second and third phases, respectively, and connected in series with the first 14, second 15 and third 16 circuit-breaking modules, respectively.

The reactive power compensator 1 comprises a first electromechanical contactor CT1 connected in series with the first circuit-breaking module 14. The ends of the first electromechanical contactor CT1 are referenced A and C, the end A being connected to the first circuit-breaking module 14.

The reactive power compensator 1 comprises a second electromechanical contactor CT2 connected in series with the third circuit-breaking module 16. The ends of the first electromechanical contactor CT2 are referenced B and D, the end B being connected to the third circuit-breaking module 16.

The first and second electromechanical contactors CT1, CT2 each comprise at least one upstream power terminal 18, at least one downstream power terminal 20 and at least one movable contact, not shown. In a manner known per se, the movable contact is movable between a closed position of the contactor CT1, CT2 wherein the movable contact is in contact with the respective upstream and downstream power terminals 18, 20 and allow a current to flow between the upstream and downstream power terminals 18, 20 in two directions, and an open position of the contactor CT1, CT2 wherein the movable contact is separated from the respective upstream and downstream power terminals 18, 20, the current thus not being able to flow between the upstream and downstream power terminals 18, 20.

The first and second electromechanical contactors CT1, CT2 each comprise a control terminal 22 for controlling the corresponding movable contact(s) between the closed and open positions.

In the example of an embodiment in FIG. 1, the first and second electromechanical contactors CT1, CT2 each comprise three upstream power terminals 18, three downstream power terminals 20 and three movable contacts not shown. The movable contacts of the contactors CT1, CT2 are used in parallel to minimise overheating and reduce the size of the compensator. In other words, the three upstream power terminals 18 are interconnected, at the end A, or B, and connected to the corresponding circuit-breaking module 14, 16, and the three downstream power terminals 20 are interconnected, at the end C, or D, the three movable contacts being suitable for being controlled simultaneously.

The reactive power compensator 1 further comprises a capacitor assembly 24. In the example of an embodiment in FIG. 1, the capacitor assembly 24 is arranged in a triangular configuration, each of the vertexes E, F, G of the triangle corresponding to a respective phase Ph1, Ph2, Ph3.

Additionally and optionally, the reactive power compensator 1 further comprises a discharge resistor assembly, not shown, each discharge resistor being connected in parallel with a respective capacitor of the capacitor assembly 24.

The reactive power compensator 1 further comprises a monitoring device 28, the monitoring device 28 comprising a memory 30 and a processor 32 associated with the memory 30, and means 33 for measuring the voltage between the upstream and downstream power terminal 18, 20 of at least one electromechanical contactor CT1, CT2.

The assembly 24 comprises a first capacitor C1 connected between the first phase Ph1 and the second phase Ph2, a second capacitor C2 connected between the second phase Ph2 and the third phase Ph3, and a third capacitor C3 connected between the third phase Ph3 and the first phase Ph1. In other words, one end of the first capacitor C1 is connected to the vertex E, which is in turn connected to the end C of the first contactor CT1 associated with the first phase Ph1, and the other end of the first capacitor C1 is connected to the vertex F, which is in turn connected to the second inductive resistor 20 associated with the second phase Ph2. One end of the second capacitor C2 is connected to the vertex F and the other end of the second capacitor C2 is connected to the vertex G, which is in turn connected to the end D of the second contactor CT2 associated with the third phase Ph3. Finally, one end of the third capacitor C3 is connected to the vertex G and the other end of the third capacitor C3 is connected to the vertex E.

The voltage at the terminals of the first capacitor C1 is referenced U12, the voltage at the terminals of the second capacitor C2 is referenced U23, and the voltage at the terminals of the third capacitor C3 is referenced U31, as shown in FIG. 1.

The memory 30 is suitable for storing software 34 for measuring a first voltage $U_{AC}$ between the upstream and downstream power terminals 18, 20 of the first contactor CT1, and a second voltage $U_{BD}$ between the upstream and downstream power terminals 18, 20 of the second contactor CT2.

The memory 30 is also suitable for storing a first software program 36 for controlling the first contactor CT1 according to a predetermined control algorithm, and second software program 38 for controlling the second contactor CT2 according to a predetermined control algorithm. The first and second control software programs 36, 38 act as means for controlling the electromechanical contactors CT1, CT2 according to the predetermined control algorithm and via the control terminals 22. Alternatively, the control means 36, 38 are embodied in the form of a dedicated integrated circuit or in the form of a programmable logic circuit. The control means are suitable for obtaining relatively stable closing and opening times, which are not sensitive to voltage and temperature variations. The control means also calculate the closing and opening times.

The measuring means 33 comprise the measuring software 34 and, for example, resistive bridges 40, 42, a first resistive bridge 40 being suitable for transmitting a first representative signal of the voltage between the upstream and downstream power terminals 18, 20 of the first contactor CT1 to the measuring the software program 36 and a second resistive bridge 42 being suitable for transmitting a second representative signal of the voltage between the upstream and downstream power terminals 18, 20 of the second contactor CT2 to the measuring software 36.

Alternatively, the measuring means 33 are suitable for measuring only the voltage $U_{AC}$ between the upstream and downstream power terminals 18, 20 of the first contactor CT1, and the closure of the first contactor CT1 is determined on the basis of the voltage $U_{AC}$ measured by the measuring means 33, the closure of the second contactor CT2 being determined according to that of the first contactor CT1 with a predetermined time delay between the closure of the first contactor CT1 and the closure of the second contactor CT2.

The predetermined time delay is, for example, substantially equal to one quarter of the three-phase voltage period.

The control means 36, 38 are suitable for sending opening or closing control signals to the control terminal 22, of the first CT1 and second CT2 contactors, respectively, according to the predetermined control algorithm.

The predetermined control algorithm comprises the closure of a respective electromechanical contactor CT1, CT2 for a substantially zero voltage between the upstream and downstream power terminals 18, 20 thereof, and opening of a respective electromechanical contactor CT1, CT2 for a substantially minimum power value of the capacitors C1, C2, C3 to which said contactor CT1, CT2 is connected, the minimum value of the power stored in the capacitors C1, C2, C3 being obtained at the end of the opening sequence.

The control means 36, 38 further comprise means for time shifting the transmission of the control signal according to a switching time measurement of each of the contactors CT1, CT2. Time shifting of signal transmission is performed, for example, using a moving average. The moving average makes it possible to account for slow changes in the closing and opening times.

The operating mode for opening the first and second electromechanical contactors CT1, CT2 of the reactive power compensator 1 will now be explained using FIGS. 2 and 3 based on simulation and actual measurements, respectively.

FIG. 2 represents the respective progression over time of the voltages U12, U23, U31 at the terminals of the first C1, second C2 and third C3 capacitors of the assembly 24 for the opening the first and second electromechanical contactors CT1, CT2.

In FIG. 2, the voltages U12, U23, U31 at the terminals of the capacitors C1, C2, C3 are sinusoidal, having the same amplitude and out of phase by an angle of $2\times\pi/3$, in a manner known per se. At a time t0, shown in FIG. 2, the voltage U31 measured by the measuring means 33 is substantially zero. The first control software program 36 then opens the first contactor CT1 at a time t1, and the second control software program 38 opens the second contactor CT2 at a time t2. The control signals for opening the first contactor CT1 and the second contactor CT2 respectively are sent before the times t1 and t2 respectively by the first and second control software programs 36, 38, in order to account for the switching time of the contactors CT1, CT2. In other words, the times t1 and t2 respectively correspond to the times at which the first contactor CT1 and the second contactor CT2 respectively are actually open. The opening of the contactors CT1, CT2 is actuated to discharge the capacitors C1, C2, C3. After opening the two contactors CT1 and CT2, each of the voltages U12, U23, U31 at the terminals of the capacitors C1, C2, C3 is zero.

In FIG. 2, the capacitors C1, C2, C3 are discharged within approximately 6.67 ms from the detection of the zero intercept of one of the voltages U12, U23, U31 at the terminals of the capacitors C1, C2, C3, when the network frequency is equal to 50 Hz. This capacitor discharge time is approximately 5.5 ms when the network frequency is equal to 60 Hz.

The conditions for opening the first contactor CT1 to obtain the minimum value of the power stored in the capacitors to which the first contactor CT1 is connected verify, for example, the following equation [1]:

the conditions for opening the first contactors to obtain the minimum power value stored in the capacitors verify the following equation $$U31-U12=0 \qquad [1],$$

i.e. when U31=U12, which is verified at the time t1, in the example of an embodiment in FIG. 2.

Similarly, the conditions for opening the second contactor CT2 to obtain the minimum value of the power stored in the capacitors to which the connected contactor CT2 is connected verify, for example, the following equation [2]:

$$U31-U23=0 \qquad [2],$$

i.e. when U31=U23, which is verified at the time t2, in the example of an embodiment in FIG. 2.

FIG. 3 shows a further example, for measured values, of opening of the contactors CT1, CT2 when a voltage measured by the measuring means 33 at the terminals of a capacitor is substantially zero. At a time t'0, a voltage Ucapa corresponding to a voltage U12, U23, U31 at the terminals of a respective capacitor C1, C2, C3 is substantially zero. At a time t'1, the second contactor CT2 is open. Subsequently, after a phase shift of $\pi/2$, i.e. a time delay substantially equal to one quarter of the period of the three-phase voltage of the network 4, the first contactor CT1 is open at the time t'2. When the frequency of the voltage of the network 4 is 50 Hz, the phase shift of $\pi/2$ corresponds to a 5 ms delay between the opening of the second contactor CT2 and the first contactor CT1. After the time t'2, the voltage curves, referenced UCT1 and UCT2, respectively, between the upstream and downstream power terminals 18, 20 of the first and second contactors CT1 and CT2 have substantially the same amplitude, indicating that the contactors CT1, CT2 have indeed been switched for discharged capacitors C1, C2, C3.

The opening of each respective contactor CT1, CT2 corresponds, within a tolerance preferably equal to plus or minus 500 µs, to the time t1, t2 where the power value of the capacitors C1, C2, C3, to which the contactors CT1, CT2 are connected, is minimal, at the end of the opening sequence.

In FIG. 3, the capacitors C1, C2, C3 are discharged in a time of approximately 6.67 ms from the detection of a zero intercept of the voltage Ucapa, when the network frequency is equal to 50 Hz. This capacitor discharge time is approximately 5.5 ms when the network frequency is equal to 60 Hz.

The operating mode of the closure of the contactors CT1, CT2 of the reactive power compensator 1 will now be explained using FIG. 4.

Similarly to FIG. 3, FIG. 4 shows the progression of the voltages UCT1, UCT2 between the upstream and downstream power terminals 18, 20 of the contactors CT1, CT2, and the voltage Ucapa and a current Icapa at the terminals of a capacitor C1, C2, C3.

Before a time t3 shown in FIG. 4, the voltages UCT1, UCT2 are sinusoidal, having the same amplitude, and out of phase by an angle of 2×π/3, in a manner known per se.

At the time t3, the voltage UCT2 is substantially zero and the control software program 36 has previously actuated the closure of the second contactor CT2 so that it has been completed at the time t3. The current Icapa then appears from this time t3.

Similarly, at the time t4, the voltage UCT1 is substantially zero and the control software program 36 has previously actuated the closure of the first contactor CT1 so that it has been completed at the time t4. The closure of the first contactor CT1 thus corresponds to the switch from single phase mode to three-phase mode.

Before closing the first and second contactors CT1, CT2, the voltage Ucapa and the current Icapa are zero. After the opening thereof, the voltage Ucapa and the current Icapa are zero.

The closure of each respective contactor CT1, CT2 corresponds, within a tolerance preferably equal to plus or minus 800 µs, to the time t3, t4 where the value of the voltage UCT1, UCT2 between the upstream and downstream power terminals 18, 20 of the corresponding contactor CT1, CT2 is zero.

The first and second control software programs 36, 38 send control signals for opening and closing the respective contactors CT1, CT2 and account, over time, for the switching time of each of the contactors CT1, CT2 for the various opening and closing phases thereof.

Alternatively, only the voltage $U_{AC}$ between the upstream and downstream power terminals 18, 20 of the first contactor CT1 is measured, the closure of the first contactor CT1 being determined on the basis of the voltage $U_{AC}$ measured by the measuring means 33, such as a zero intercept of the voltage $U_{AC}$, and the closure of the second contactor CT2 is determined according to that of the first contactor CT1 with a predetermined time delay between the closure of the first contactor CT1 and the closure of the second contactor CT2. The predetermined time delay is, for example, substantially equal to one quarter of the three-phase voltage period.

According to a further embodiment, not shown, the reactive power compensator 1 comprises three contactors, each contactor being electrically connected by one of the respective phases Ph1, Ph2, Ph3.

One phase of the first, second and third phases Ph1, Ph2, Ph3 is connected first to the capacitor assembly 24 via the closure of a corresponding contactor of the three contactors, this connection being made at any time given that the connection is made when no current is present on the upstream and downstream power terminals 18, 20 of the corresponding contactor (off-load connection).

The two other phases of the first, second and third phases Ph1, Ph2, Ph3 are then connected to the capacitor assembly 24 via the closure of the two other corresponding contactors, the control algorithm of said two other contactors being equivalent to that described for the previous embodiment wherein the reactive power compensator merely comprises two contactors.

The two other corresponding contactors are then opened according to a control algorithm equivalent to that described for the previous embodiment wherein the reactive power compensator merely comprises two contactors in order to obtain the minimum value of the power stored in the capacitors to which the two other contactors are connected.

Finally, the contactor of the three contactors to be closed first is opened, this opening being performed at any time after opening the two other contactors, given that the opening is performed when no current is present on the upstream and downstream power terminals 18, 20 of the contactor (off-load disconnection).

In this embodiment, the failure of any of the three contactors resulting in locking of the defective contactors in a closing position, i.e. fusing of the movable contact(s) in the closed position of the contactor, does not imply a fault of the reactive power compensator 1 in that the degraded operation relates to the previously described case, two contactors remaining operational.

The compensator 1 according to the invention thus makes it possible to reduce the risks of damage to the first and second electromechanical contactors CT1, CT2, while conducting quick reactive power compensation, i.e. compensation with discharge of the assembly 24 of capacitors C1, C2, C3 in some tens of ms.

The compensator 1 according to the invention is also suitable for doing away with the presence of inductive resistors, i.e. electromagnetic coils, respectively associated with the first, second and third phases and connected in series with the first 14, second 15 and third 16 circuit-breaking modules, respectively.

The invention claimed is:

1. A reactive power compensator for a three-phase network having a first phase, a second phase and a third phase, the compensator comprising:
    an assembly of capacitors;
    at least two electromechanical contactors electrically connected to the assembly of capacitors, each contactor comprising at least one upstream power terminal and at least one downstream power terminal, an electric current circulating between the upstream and downstream power terminals in the closed position of the contactor, a first electromechanical contactor being configured to connect to the first phase and a second electromechanical contactor being configured to connect to the third phase; and
    circuitry configured to
        measure the voltage between the upstream and downstream power terminals of at least one electromechanical contactor, and
        control the electromechanical contactors according to a predetermined control algorithm,
    wherein the control algorithm includes closure of one of the first or second electromechanical contactors for a substantially zero voltage between the upstream and downstream power terminals thereof, and opening of another of the first or second electromechanical contactors for a substantially minimum power value of the capacitor or the capacitors to which the other of the first or second electromechanical contactor is connected, and
    wherein the circuitry is further configured to measure only the voltage between the upstream and downstream power terminals of the first electromechanical contactor, the closure of the first electromechanical contactor being determined on the basis of the voltage measured, closure of the second electromechanical contactor being determined as a function of the closure of the first electromechanical contactor with a predetermined time delay between the closure of the first electromechanical contactor and the closure of the second electromechanical contactor.

2. The reactive power compensator according to claim 1, wherein the circuitry is further configured to measure the voltage between the upstream and downstream power terminals of the first electromechanical contactor, and of the second electromechanical contactor, the closure of the second electromechanical contactor being determined on the basis of the voltage measured between the upstream and downstream power terminals of at least one of the first and second electromechanical contactors.

3. The reactive power compensator according to claim 1, wherein the three-phase voltage of the network is periodic, and the predetermined time delay is substantially equal to one quarter of the three-phase voltage period.

4. The reactive power compensator according to claim 1, comprising exactly two electromechanical contactors.

5. The reactive power compensator according to claim 1, wherein the assembly of capacitors comprises three capacitors arranged according to a triangular configuration, a first capacitor being connected between the first and second phases, a second capacitor being connected between the second and third phases, and a third capacitor being connected between the first and third phases.

6. The reactive power compensator according to claim 2, wherein the assembly of capacitors comprises three capacitors arranged according to a triangular configuration, a first capacitor being connected between the first and second phases, a second capacitor being connected between the second and third phases, and a third capacitor being connected between the first and third phases.

7. The reactive power compensator according to claim 3, wherein the assembly of capacitors comprises three capacitors arranged according to a triangular configuration, a first capacitor being connected between the first and second phases, a second capacitor being connected between the second and third phases, and a third capacitor being connected between the first and third phases.

8. The reactive power compensator according to claim 4, wherein the assembly of capacitors comprises three capacitors arranged according to a triangular configuration, a first capacitor being connected between the first and second phases, a second capacitor being connected between the second and third phases, and a third capacitor being connected between the first and third phases.

9. The reactive power compensator according to claim 5, wherein conditions for opening the first electromechanical contactor to obtain the minimum power value stored in the capacitors correspond to the following equation:

$$U31 - U12 = 0$$

where $U31$ represents the voltage at the terminals of the third capacitor and $U12$ represents the voltage at the terminals of the first capacitor.

10. The reactive power compensator according to claim 6, wherein conditions for opening the first electromechanical contactor to obtain the minimum power value stored in the capacitors correspond to the following equation:

$$U31 - U12 = 0$$

where $U31$ represents the voltage at the terminals of the third capacitor and $U12$ represents the voltage at the terminals of the first capacitor.

11. The reactive power compensator according to claim 1, wherein the conditions for opening the first electromechanical contactor to obtain the minimum power value stored in the capacitors correspond to the following equation:

$$U31 - U12 = 0$$

where $U31$ represents the voltage at the terminals of the third capacitor and $U12$ represents the voltage at the terminals of the first capacitor.

12. The reactive power compensator according to claim 7, wherein conditions for opening the first electromechanical contactor to obtain the minimum power value stored in the capacitors correspond to the following equation:

$$U31 - U12 = 0$$

where $U31$ represents the voltage at the terminals of the third capacitor and $U12$ represents the voltage at the terminals of the first capacitor.

13. The reactive power compensator according to claim 5, wherein conditions for opening the second electromechanical contactor to obtain the minimum power value stored in the capacitors correspond to the following equation:

$$U31 - U23 = 0$$

where $U31$ represents the voltage at the terminals of the third capacitor and $U23$ represents the voltage at the terminals of the second capacitor.

14. The reactive power compensator according to claim 9, wherein conditions for opening the second electromechanical contactor to obtain the minimum power value stored in the capacitors correspond to the following equation:

$$U31 - U23 = 0$$

where $U31$ represents the voltage at the terminals of the third capacitor and $U23$ represents the voltage at the terminals of the second capacitor.

15. The reactive power compensator according to claim 1, further comprising three contactors, each being configured to electrically connect to a respective phase of the network.

16. The reactive power compensator according to claim 1, wherein closure of each electromechanical contactor corresponds to a zero voltage between the upstream and downstream power thereof within a first tolerance, the first tolerance being equal to plus or minus 800 µs.

17. The reactive power compensator according to claim 1, wherein opening of each electromechanical contactor corresponds, within a second tolerance, to the minimum value the power of the capacitor or the capacitors to which said contactor is connected, the second tolerance being equal to plus or minus 500 µs.

18. The reactive power compensator according to claim 1, wherein the circuitry is further configured to send control signals to the first and second electromechanical contactors, and to time-shift transmission of the control signal according to a switching time measurement of each of the electromechanical contactors.

* * * * *